Figure 1:
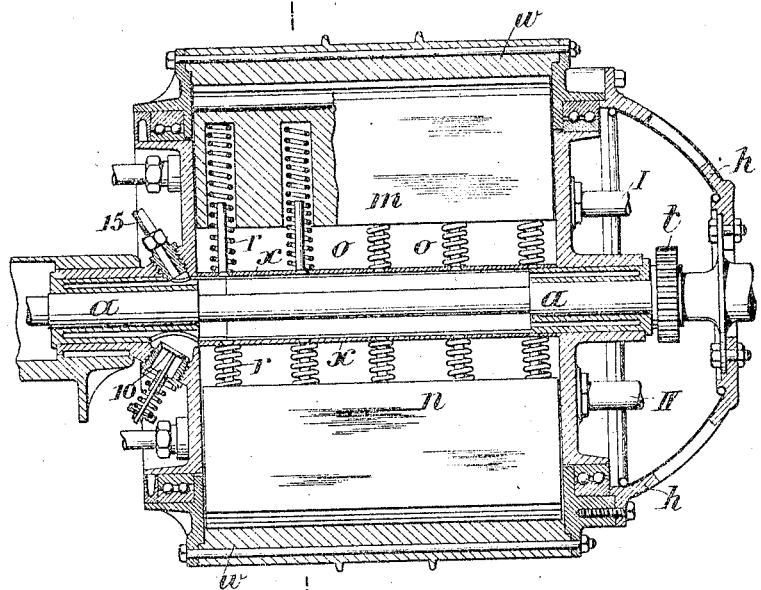

S. DIAMANT.
ROTARY INTERNAL COMBUSTION ENGINE.
APPLICATION FILED DEC. 16, 1911.

1,101,688.

Patented June 30, 1914.
4 SHEETS—SHEET 1.

Witnesses
Edward D. Bailey
C. D. Swett

Inventor
S. Diamant
by F. Dittmar
Attorney

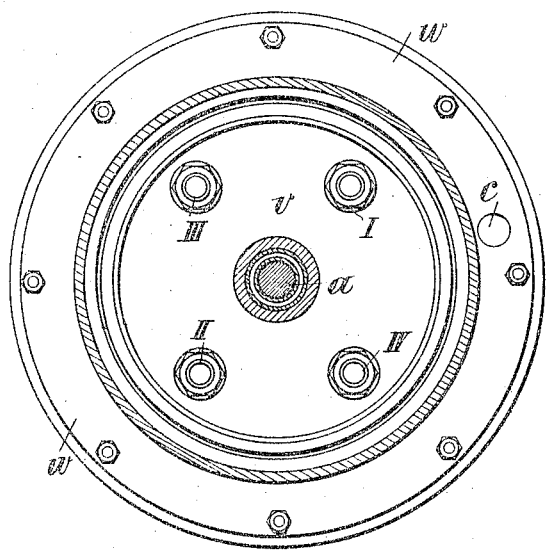
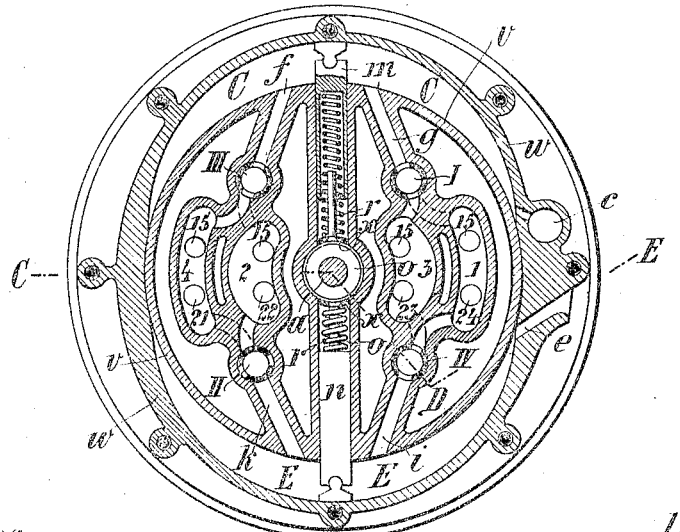

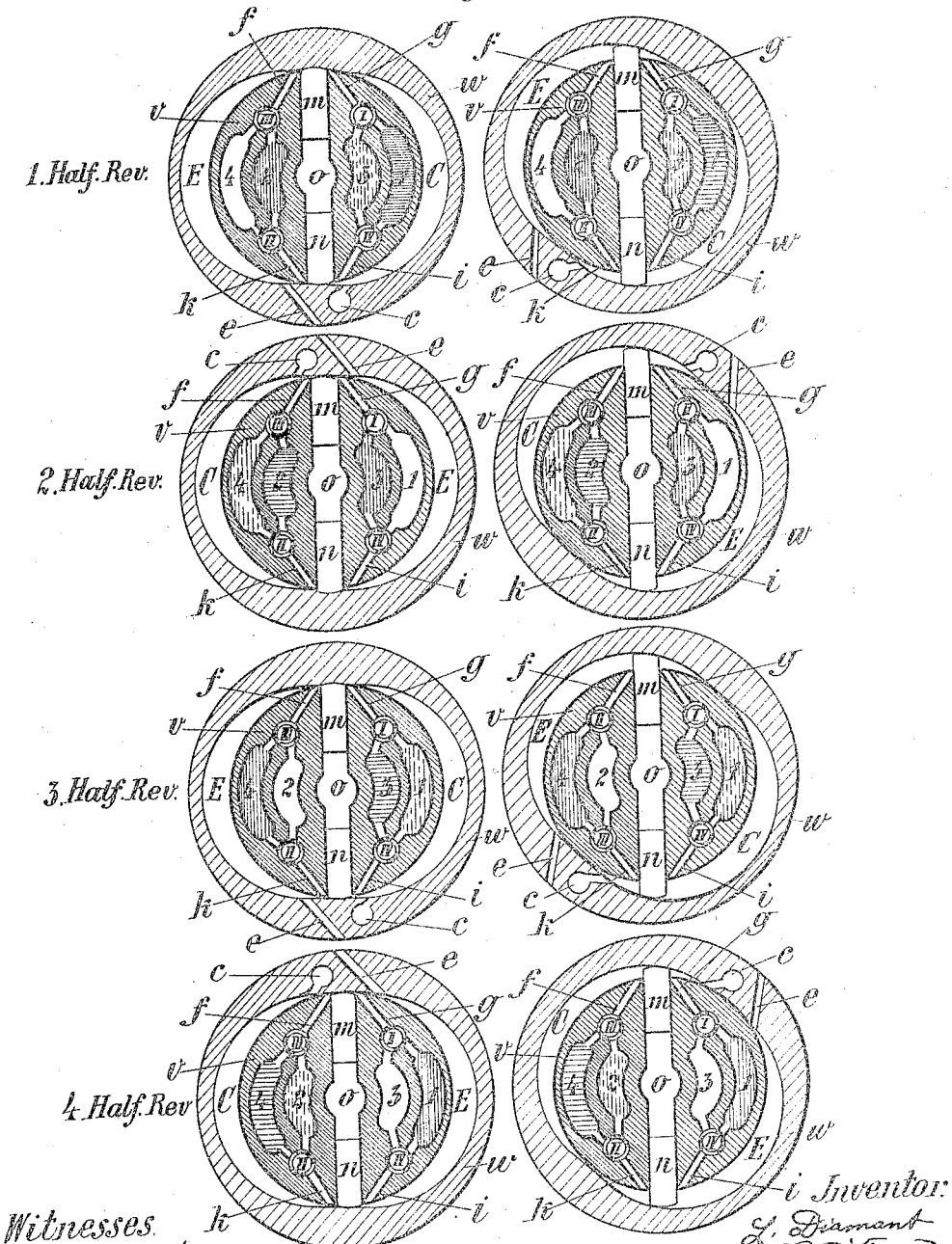

UNITED STATES PATENT OFFICE.

SIGISMONDO DIAMANT, OF BUDAPEST, AUSTRIA-HUNGARY.

ROTARY INTERNAL-COMBUSTION ENGINE.

1,101,688.  Specification of Letters Patent.  Patented June 30, 1914.

Application filed December 16, 1911. Serial No. 666,104.

*To all whom it may concern:*

Be it known that I, SIGISMONDO DIAMANT, mechanical engineer, subject of the Emperor of Austria-Hungary, residing at Budapest, in the Empire of Austria-Hungary, have invented certain new and useful Improvements in Rotary Internal-Combustion Engines, of which the following is a specification, reference being had therein to the accompanying drawing.

This invention relates to a new method of working for rotary combustion engines and to a suitable rotary engine for carrying out the new method of working.

The method of working is distinguished by the fact that four explosion cells arranged in the stationary part of the rotary engine are provided in succession with carbureted air under pressure, by a single chamber arranged in the rotary part, under the action of one of two pistons guided in the stationary part of the engine, each filled cell is then left charged during one phase for the purpose of heating the mixture, and exploded and scavenged during the following two phases, whereby it is brought into communication at the moment of explosion with the second chamber in the rotary part, in which second chamber one of the said two pistons is at the beginning of its stroke at the moment of explosion.

The distinguishing features of the new engine lie in the fact that the same consists of a stationary drum like body containing four explosion cells and of a tube-like body rotating around the said drum like body, which tube-like body contains two diametrically opposite chambers formed by eccentric cavities in which engage separate diametrically opposite pistons guided in the said stationary body, and whereby one of the chambers is constantly in communication with the atmosphere at its front end in the direction of rotation, and the second chamber is in constant communication with the atmosphere at its back end in the direction of rotation. The first named chamber, hereinafter called the compression chamber, presses its contents of air, at every half revolution, under the action of one of the pistons and suitable governing members, into one of the four explosion cells and thereby provides during a double revolution of the rotary body, each of the explosion cells once with air under pressure. The second named chamber arranged in the rotary ring like body, hereinafter called the expansion chamber, is brought, by means of suitable governing members, into communication after every half revolution with another cell, namely with that of the four explosion cells which has just exploded, namely in that moment in which the piston working with this expansion chamber is at the commencement of its stroke. A further particular distinguishing feature of the engine lies in the fact that the space between the pistons of the pump is utilized for the purpose of scavenging the cells with fresh air; for this purpose this space is in communication on the one hand with the open air through a suction valve, and on the other hand with each of the explosion cells through four pipes each provided with a back pressure valve, so that the air drawn in by the outward movement and forced out by the inward movement of the pumps always flows into the cell in which the explosion has taken place, and which is placed in communication with the open air by the governing members. And in order that my invention may be more fully understood I have caused to be appended hereunto five sheets of drawings marked with letters of reference indicating like parts in the various figures.

Figure 3:
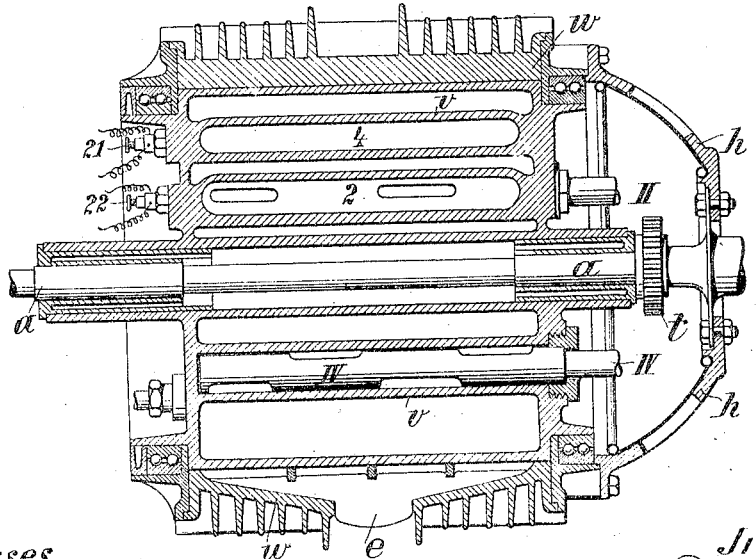
Figure 4:
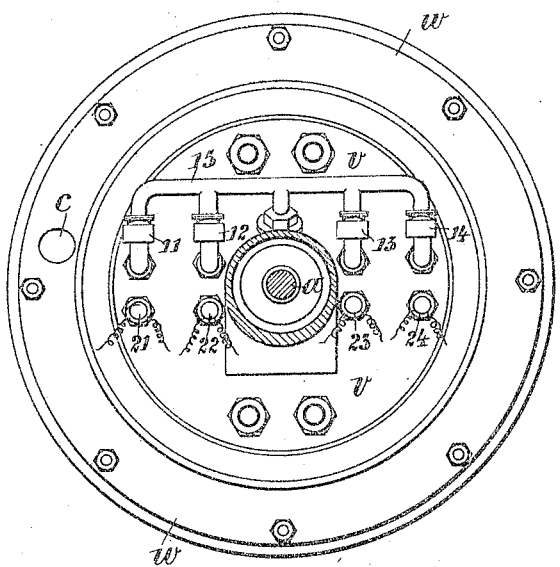

Figures 1 and 2 are respectively a longitudinal axial section and a vertical cross section on line A B Fig. 1 of an embodiment of a rotary internal combustion engine constructed in accordance with the invention. Fig. 3 is a horizontal section on the broken line C D E of Fig. 2. Figs. 4 and 5 are two side views of the engine. Fig. 6 is a diagram showing the succession of phases in all four cells during four half-revolutions.

The engine comprises an unrotatably mounted drum like body $v$, in which are guided two axially situated pistons $m$, $n$ kept apart by springs $r$. In each of the halves of the stationary body $v$ formed by the pistons $m$, $n$ are arranged two chambers 1, 3 and 2, 4 respectively, of equal capacity, the walls of which are played on by cooling water, which is circulated by a pump in any known manner. The drum like, stationary body $v$ is embraced by a rotary tube-like body $w$, which is keyed to the shaft $a$, passing through the stationary part of the engine, by means of the casing parts $h$, and is provided with two eccentric cavities C and E of approximately 120 degrees in length, at diametrically opposite points on its inner periphery, in which cavities the pistons m and n kept apart from each other by the springs r, engage in any well known air tight manner. The springs r are seated on two stays x secured to the shaft a in the body v. One of the two chambers, namely E is placed in communication with the atmosphere by the port e formed in its back end in the direction of rotation of the tube like body w, and the other chamber C is placed by the port c at its front end in the direction of rotation also in communication with the atmosphere. The port c (Fig. 2) extends through the whole length of the rotary body w, and is opened on both sides of the same (see Figs. 4 and 5). The port e (see Figs. 2 and 3) opens on the periphery of the rotary body w which is provided with cooling flanges. The advantage of this arrangement of port openings lies in the fact that the exhaust gases forced out through the port e cannot contaminate the fresh air drawn in through the port c, and that, moreover, the removal of the exhaust gases is aided by centrifugal force. The chamber E is hereinafter called the expansion chamber, and the chamber C the compression chamber.

The two cells 1 and 3, situated on one side of the pistons m, n and the two cells 2 and 4 situated on the other side, are each in communication at the same end with a valve casing; these valve casings are provided with rotary valves I, II, III and IV of any known type, which open the chambers 1, 2, 3, 4 to or cut the same off, from the ports f, g, h and i opening at both sides of the pistons m, n on the periphery of the stationary body v, in accordance with the method of working. The rotary valves I, II, III, IV control therefore the communication of the cells 1-4 with the different parts of the chambers C and E divided by the pistons m, n. The actuation of these rotary valves takes place by means of suitable toothed wheel gearing (not shown) driven by the toothed wheel t on the shaft a in such a manner that they make one revolution for every two revolutions of the rotary body, that is to say, that they return to their initial position upon the completion of two revolutions by the rotary body.

The chamber o situated between the pistons m, n communicates on the one hand with the open air (Fig. 1), and on the other hand is in communication with each of the four cells 1, 2, 3, and 4 by a conduit pipe 15 with four branches, a back pressure valve 11, 12, 13 and 14 respectively being placed in each of the same (Fig. 4) in such a manner that the air drawn in through the suction valve 10 when the pistons m, n move away from each other, is forced into the conduit pipe 15 by the inward moving pistons, but can only enter into those of the four cells 1-4 in which no back pressure exists. The compressed air therefore only arrives in that cell in which the explosion has taken place, and which, as hereinafter will be described, is placed in communication with the atmosphere by the position taken up by the corresponding one of the valves I-IV for the purpose of scavenging.

In each of the cells 1-4 is an ignition plug 21-24, fixed on the opposite side of the stationary body v to that on which the governing gearing is situated. These ignition plugs are operated in accordance with the different phases by a contact maker actuated by the engine. The benzin conduits also enter the cells 1-4 from the same side as the said ignition plugs, and the necessary amount of benzin is injected by a benzin pump actuated in a known manner into each of the cells in succession according to the phases, before the air is forced in.

The compression chamber C serves the purpose of filling one of the cells 1-4 with compressed air at every half revolution of the engine; the expansion chamber E serves to take up the exploded gases flowing from one of the cells at every half revolution and by the pressure of these gases against the fixed piston causes rotation of the rotary element, or rotor.

In the diagram, Fig. 6, the rotary part of the engine is shown in four successive half revolutions 1, 2, 3 and 4, each in four positions, and it is indicated, in which phase each of the cells is, at each half turn; the rotation of the rotary part takes place in a right hand direction. In this diagram: the cells being charged are indicated by broken vertical lines; the charged cells being heated are indicated by vertical lines; the exploded cells are indicated by horizontal lines, and the cell being exhausted is left empty.

The following gives the manner of the working of the engine with reference to the diagrammatical figures of Fig. 6:

*1st half revolution, 1st group of figures.*— In the first half of the first revolution the cell 1 is exploded; the gases flowing out through the valve I and the port g reach the increasing part of the expansion chamber E and produce by their reactionary pressure against the piston p, a turning moment in the direction of rotation. The gases in the decreasing part of the chamber E resulting from an earlier explosion are forced out through the port e. The cell 4 which is in its exhausting or scavenging phase is also in communication by the port f with the decreasing part of the chamber E, so that the pistons m, n moving toward one another in the second part of the half revolution, having drawn air into the chamber o in moving away from one another, press the said air through the cell 4 which is not under pressure, into the decreasing part of the chamber E, from which it is sent into the open air through the port $e$. The decreasing part of the chamber C is placed in communication with the cell 3 by the port $i$ and the valve IV and forces its contents of air into the same. Benzin has been injected into cell 3 at the beginning of this half revolution, and vaporized under the influence of the hot walls, and forms an explosive mixture with the incoming compressed air. The increasing part of the chamber C fills with fresh air through the port $c$. The cell 2 has been charged during the previous half revolution and the inclosed air and gas heated during this half revolution (hereinbefore described as the first half revolution).

*2nd half revolution; 2nd group of figures.*—At the commencement of the second half of the first revolution of the body $w$, the cell 2 is exploded, the gases flowing out through the port $k$, and the suitably positioned valve II, reach the increasing part of the expansion chamber E and produce, by their reactionary pressure against the piston $n$ now working with this chamber E, a reactionary pressure, the turning moment of which acts in the direction of the impulse given by the earlier explosion. The gases from the earlier explosion in cell 1 still remaining in the decreasing part of the chamber E are forced out through the port $e$. The cell 1 brought to explosion in the first half revolution is also in communication with this decreasing part of the chamber E, through the port $i$, so that the compressed air, which has been forced into the cell 1 by the again approaching pistons $m$, $n$ in the second half of the half revolution, is driven into the decreasing part of the chamber E through the port $i$ and is forced from the said part through the ports $e$ into the open by the action of the piston $n$. The decreasing part of the chamber C, the whole of which has been in communication with the atmosphere between the first and second half revolution, communicates with the cell 4 through the port $f$ and the suitably positioned valve III and forces its contents of air into the said cell. At the beginning of the half revolution benzin has been injected into the cell 4, which benzin vaporizes and gives with the compressed air an explosive mixture. The increasing part of the chamber C is again filled with fresh air through the port $c$. The charge introduced into the cell 3 during the earlier half revolution is heated during the whole of the second half revolution.

*3rd half revolution; 3rd group of figures.*—At the commencement of the first half of the second revolution the cell 3, is exploded. The exploded gases flowing through the port $g$, and the suitably positioned valve I, into the increasing part of the expansion chamber E, produce by their re-actionary influence against the piston $m$, now working with this chamber E, a reactionary pressure, the turning moment of which acts in the direction of the impulse given by the earlier explosion. The gases from the earlier explosion in cell 2, still remaining in the decreasing part of the chamber E, are forced out through the port $e$. The cell 2 brought to explosion in the earlier half revolution is also in communication with this decreasing part of the chamber E, through the port $f$, so that the compressed air, which has been forced into the cell 2 by the again approaching pistons $m$, $n$, in the second half of this half revolution, is driven into the increasing part of the chamber E, through the port $f$, and is forced from the said port through the ports $e$, into the atmosphere by the action of the piston $m$. The decreasing part of the chamber C, the whole of which as before has been in communication with the atmosphere, at the commencement of the third half revolution, communicates with the cell 1, through the port $i$, and the suitably positioned valve IV and forces its contents of air into the said cell. At the beginning of the third half revolution benzin has been injected into the cell 3, which benzin vaporizes and gives, with the compressed air, an explosive mixture. The increasing part of the chamber C is again filled with fresh air through the port $c$. The charge introduced into the cell 4 during the earlier half revolution, is heated during the whole of the third half revolution.

*4th half revolution; 4th group of figures.*—At the commencement of the second half of the second revolution, the cell 4 is exploded. The exploded gases flowing through the port $k$ and the suitably positioned valve II, reach the increasing part of the expansion chamber E, and produce by their reactionary influence against the piston $n$, now working with the chamber E, a reactionary pressure, the turning moment of which acts in the direction of the impulse given by the earlier explosion. The gases from the earlier explosion in cell 3, still remaining in the decreasing part of the chamber E, are forced out through the port $e$. The cell 3, brought to explosion in the earlier half revolution, is also in communication with the decreasing part of the chamber E, through the port $i$ so that the compressed air, forced into the cell 3, by the again approaching pistons $m$, $n$, in the second half of the fourth half revolution, is driven into the decreasing part of the chamber E, through the port $i$, and is forced from the said port through the ports $e$, into the atmosphere, by the action of the piston $n$. The decreasing part of the chamber C, the whole of which has been in communication with the atmosphere, at the commencement of the fourth half revolution, communicates with the cell 2, through the port $f$ and the suitably positioned valve III, and forces the contents of air into the said cell. At the beginning of the half revolution, benzin has been injected into the cell 2, which benzin vaporizes and gives with the compressed air, an explosive mixture. The increasing part of the chamber C is again filled with fresh air through the port $c$. The charge introduced into the cell I during the earlier half revolution, is heated during the whole of this half revolution.

As will be readily understood, the arrangement of the two parts of this engine may be so altered that the inner drum-like part rotates, and the outer ring-like part remains stationary.

Having now particularly described and ascertained the nature of this invention and in what manner the same is to be performed, I declare that what I claim is:

1. In a four cycle rotary engine of the internal combustion type, a stator provided with a series of cells, said cells being in port communication with the exterior of the stator, a rotor surrounding said stator and provided with a compression chamber between the stator and rotor, said rotor being provided with spaced abutments arranged to provide chambers between the stator and rotor, retractile pistons carried by the stator and bearing against the rotor, and valve means governing the flow of gases through the port communications of said cells.

2. In a four cycle rotary engine of the internal combustion type, a pair of members constituting a stator and a rotor, one of said members being provided with a plurality of pairs of cells, the other member being provided with a single compression chamber between said stator and said rotor and an exhaust passage, the first mentioned member being further provided with valve chambers arranged at the ends of said pairs of cells, each valve chamber being in port communication with a pair of cells, one of said members being further provided with spaced abutments arranged to provide chambers between said members, the other of said members being provided with retractile pistons, rotary valves fitted in valve seats and means to cause explosions successively in said cells.

In testimony whereof I affix my signature, in the presence of two witnesses.

SIGISMONDO DIAMANT.

Witnesses:
 FRIEDRICH BINDER,
 AUGUST FUGGER.